(12) United States Patent
Lee et al.

(10) Patent No.: US 7,981,983 B2
(45) Date of Patent: *Jul. 19, 2011

(54) SLURRY PHASE POLYMERISATION PROCESS

(75) Inventors: Stephen Kevin Lee, London (GB); Daniel Marissal, Sausset les Pin S. (FR); Brent R. Walworth, Sint-Niklaas (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/591,471

(22) Filed: Nov. 20, 2009

(65) Prior Publication Data

US 2010/0144968 A1 Jun. 10, 2010

Related U.S. Application Data

(62) Division of application No. 12/227,700, filed as application No. PCT/GB2007/001862 on May 18, 2007, now Pat. No. 7,718,732.

(30) Foreign Application Priority Data

| May 26, 2006 | (EP) | 00625274 |
| May 26, 2006 | (EP) | 06252746 |
| May 26, 2006 | (EP) | 06252748 |

(51) Int. Cl.
*C08F 2/12* (2006.01)
*B01J 19/18* (2006.01)

(52) U.S. Cl. ............... 526/64; 526/65; 526/909; 525/52

(58) Field of Classification Search .................. 526/64, 526/65, 909; 525/52
See application file for complete search history.

(56) References Cited

U.S. PATENT DOCUMENTS

| 3,229,754 | A |   | 1/1966  | Hoag |
| 3,279,087 | A |   | 10/1966 | Hearne et al |
| 3,405,109 | A |   | 10/1968 | Rohlfing |
| 6,664,352 | B1 |  | 12/2003 | Fredriksen et al. |
| 7,718,732 | B2 | * | 5/2010 | Lee et al. ......................... 525/52 |
| 2003/0191251 | A1 |  | 10/2003 | McGrath ........................ 526/64 |
| 2005/0272891 | A1 |  | 12/2005 | Fouarge et al. |

FOREIGN PATENT DOCUMENTS

| EP | 0891990 A3 * | 11/1999 |
| GB | 0426057.6 | 11/2004 |
| GB | 0426058.4 | 11/2004 |
| GB | 0426059.2 | 11/2004 |
| WO | WO 92/12181 A1 | 7/1992 |
| WO | WO 92/12182 A1 | 7/1992 |
| WO | WO 02/28922 A1 | 4/2002 |
| WO | WO 03/044064 A1 | 5/2003 |
| WO | WO 03/070365 A1 | 8/2003 |
| WO | WO 03/074167 A1 | 9/2003 |
| WO | WO 2004/024780 A1 | 3/2004 |
| WO | WO 2004/024781 A1 | 3/2004 |
| WO | WO 2005/044871 A1 | 5/2005 |
| WO | WO 2005/082962 A2 * | 9/2005 |
| WO | WO 2006/003144 A1 | 1/2006 |
| WO | WO 2006/026493 A1 | 3/2006 |
| WO | WO 2006/056756 A1 | 6/2006 |
| WO | WO 2006/056761 A1 | 6/2006 |
| WO | WO 2006/056763 A1 | 6/2006 |

OTHER PUBLICATIONS

PCT International Preliminary Examination Report; International Application No. PCT/EP2007/001862; International Filing Date May 18, 2007 (7 pgs).
Abulnaga, Baha E.; "Slurry Systems Handbook"; *The McGraw-Hill Companies*; pp. 4.5-4.9 (2002) (Total-D11).
Abstract, Process Economics Program Report 19E; "Biomodal Linear Low-Density Polyethylene", 137 pgs (Nov. 1999).
Abstract, Process Economics Program Report 19F; "Supercritical Loop Reactor Slurry Process for Producing Polyethylene and Polypropylene", 134 pgs (Jun. 1996).
Abstract, Process Economics Program Report No. 19C; "High Density Polyethylene", 300 pgs.
Magovern, Robert L.; Process Economics Program; Report No. 19; "Linear Polyethylene and Polypropylene", 350 pgs (Nov. 1966).
Magovern, Robert L.; Process Economics Program; Report No. 19-A; "Linear Polyethylene and Polypropylene Supplement A", 222 pgs (Oct. 1969).
Magovern, Robert L.; Process Economics Program; Report No. 19B; "Linear Polyethylene and Polypropylene Supplement B"; 169 pgs (Feb. 1974).
Notice of Opposition to European Patent No. EP1814921, Appln. No. EP05804321.7, date of mention of the grant in the European Patent Bulletin Jan. 20, 2010; Opponent—Chevron Phillips Chemical Company LP (CPCC) 27 pgs.
Notice of Opposition to European Patent No. EP 1814921, Appln. No. EP05804321.7, date of mention of the grant in the European Patent Bulletin Jan. 20, 2010, Opponent—Total Petrochemicals Research Feluy (Total) 16 pgs.
Notice of Opposition to European Patent No. EP 1827677, Appln. No. EP05804330.8, date of mention of the grant in the European Patent Bulletin Jan. 27, 2010, Opponent—Chevron Phillips Chemical Company LP (CPCC) 32 pgs.
Notice of Opposition to European Patent No. EP 1827677, Appln. No. EP05804330.8, date of mention of the grant in the European Patent Bulletin Jan. 27, 2010, Opponent—Borealis AG (Borealis) 19 pgs.
Notice of Opposition to European Patent No. EP 1827677, Appln. No. EP05804330.8, date of mention of the grant in the European Patent Bulletin Jan. 27, 2010, Opponent—Total Petrochemicals Research Feluy (Total) 15 pgs.
The Concise Oxford Dictionary, First edited by H.W. Fowler and F.G. Fowler, Ninth Edition, 4 pgs (1996) (CPCC-D1).

(Continued)

*Primary Examiner* — Fred M Teskin
(74) *Attorney, Agent, or Firm* — Nixon & Vanderhye

(57) ABSTRACT

A process for controlling a slurry phase (co-) polymerisation process in the presence of a polymerisation catalyst, which comprises maintaining the density SPAN of the polymer powder particles (defined as the absolute value of the density difference in g/cm$^3$ between the average density of the polymer particles exiting the reactor with particle size above D90 and the average density of the material with particle size below D10) below 0.005, preferably below 0.003, more preferably below 0.0026, most preferably below 0.0023.

26 Claims, 3 Drawing Sheets

OTHER PUBLICATIONS

Magovern, Robert L.; Process Economics Program; Report No. 19-A; "Linear Polyethylene and Polypropylene Supplement A"; 14 pgs (Oct. 1969) (CPCC-D3A).

Chadwick, John L., et al; Process Economics Program; Report No. 19C; "High Density Polyethylene Supplement C"; 24 pgs (1979) (CPCC-D4A).

Ferrero, Monica A., et al; "Preliminary Design of a Loop Reactor for Bulk Propylene Polymerization"; *Polymer-Plastics Technology and Engineering*; vol. 29, No. 3; pp. 263-287 (1990) (CPCC-D10).

Declaration of Donald W. Verser; 2 pgs (Oct. 13, 2010) (CPCC DEC).

Canjar, Lawerence, N., et al; "Thermodynamic Properties and Reduced Correlations for Gases"; *Gulf Publishing Company*; 1 pg (1967) (Borealis-D5).

Vieweg, Richard, et al; "Kunststoff-Handbuch Band IV Polyolefine"; *Carl Hanser Verlag Munchen*, (1969) (Borealis-D6).

Chem Systems, Inc. "High-Density Polyethylene"; Report No. 80-5; 39 pgs (1981) (Borealis-D10).

Perry, Robert H., et al; "Perry's Chemical Engineers' Handbook Seventh Edition"; 6 pgs (1997) (Borealis-D12).

Lylykangas; "Calculations to Estimate the Density of Mixtures of Propane, Ethylene and Hydrogen"; 4 pgs. (Borealis-D14).

Slurry Systems Handbook; (Total-D11), (2002).

Chandrasekhar, V., et al; "Recent Developments in Ziegler-Natta Catalysts for Olefin Polymerization and Their Processes"; *Indian Journal of Technology*; vol. 26, pp. 53-82 (1988) (Borealis-D2).

\* cited by examiner

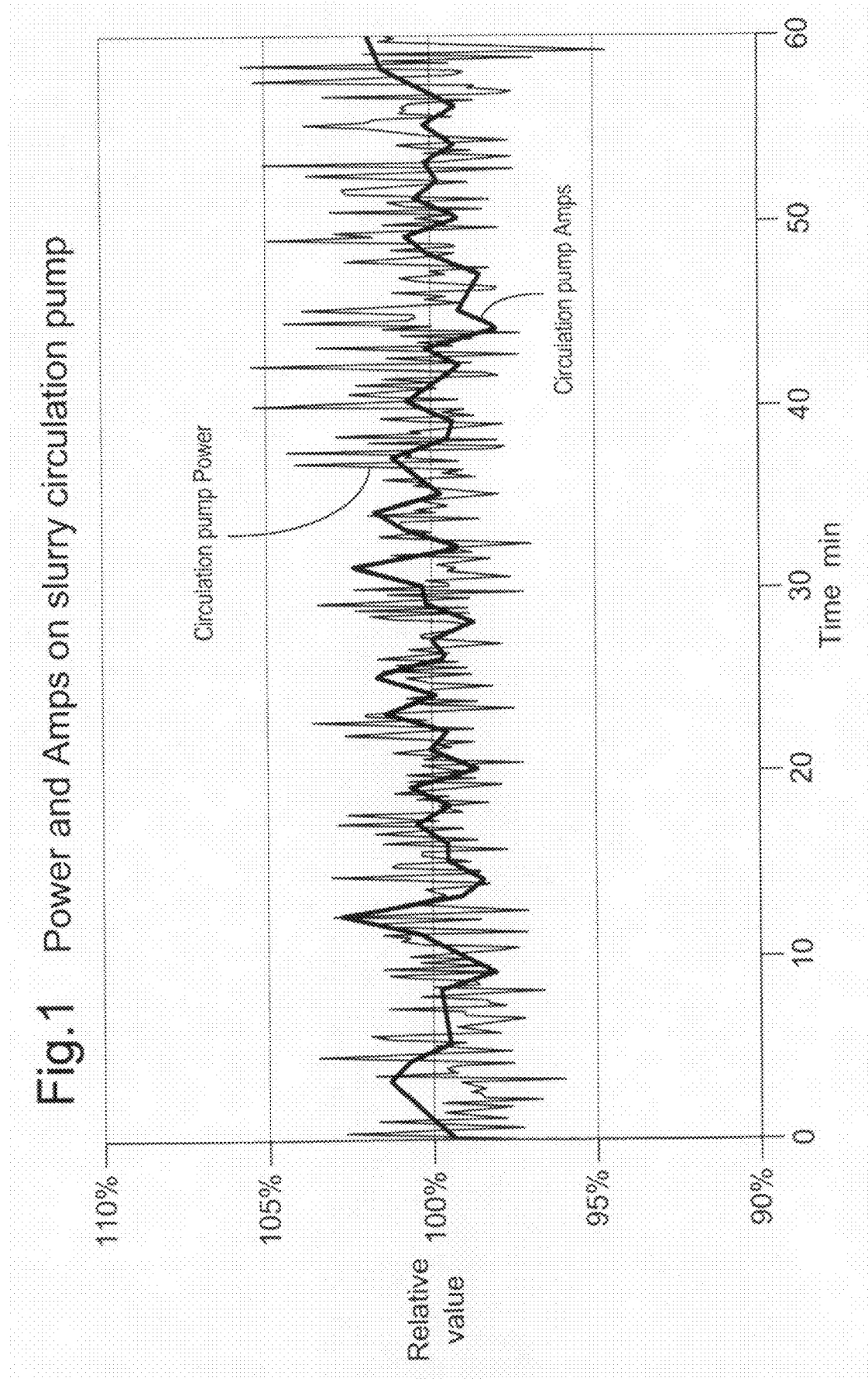

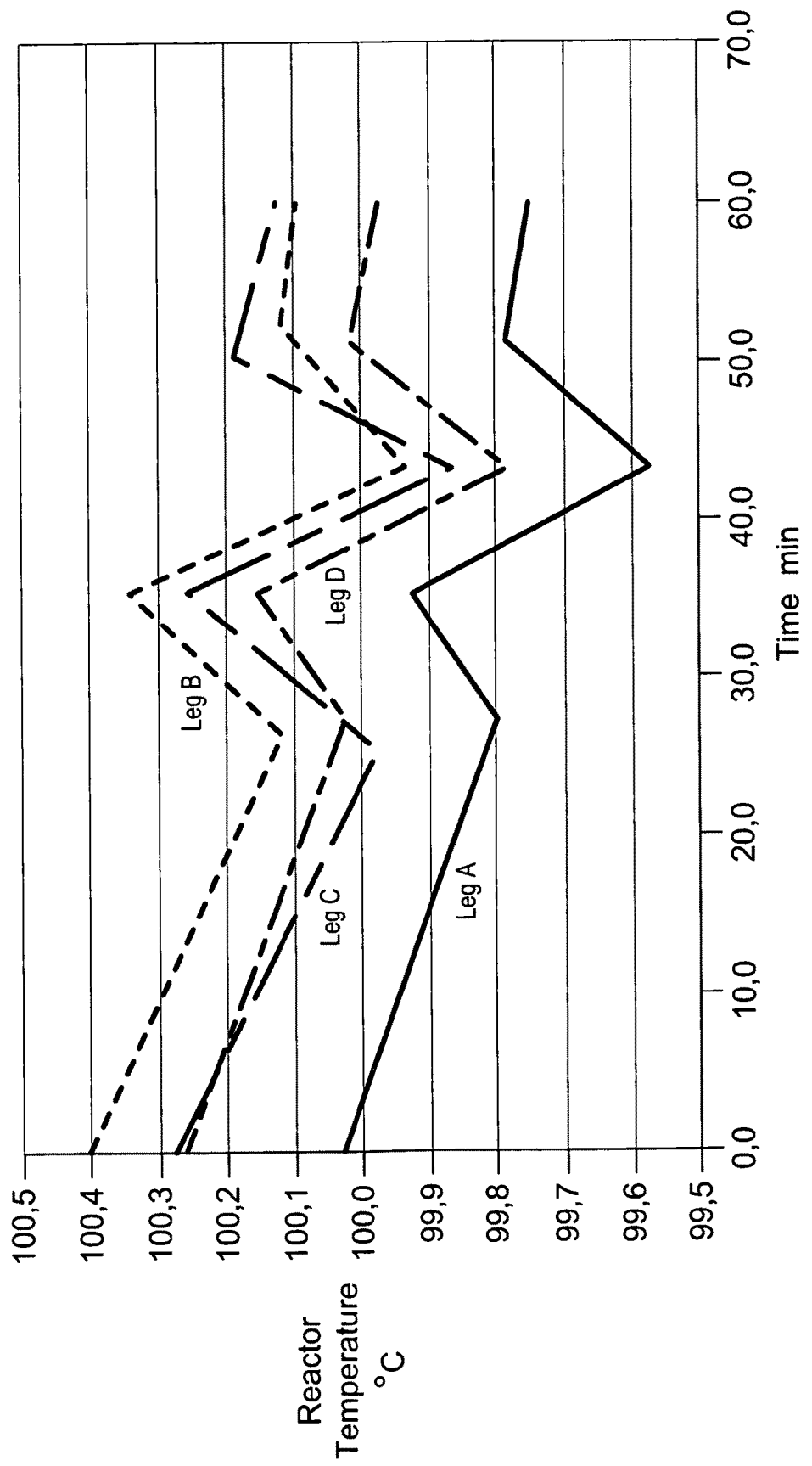

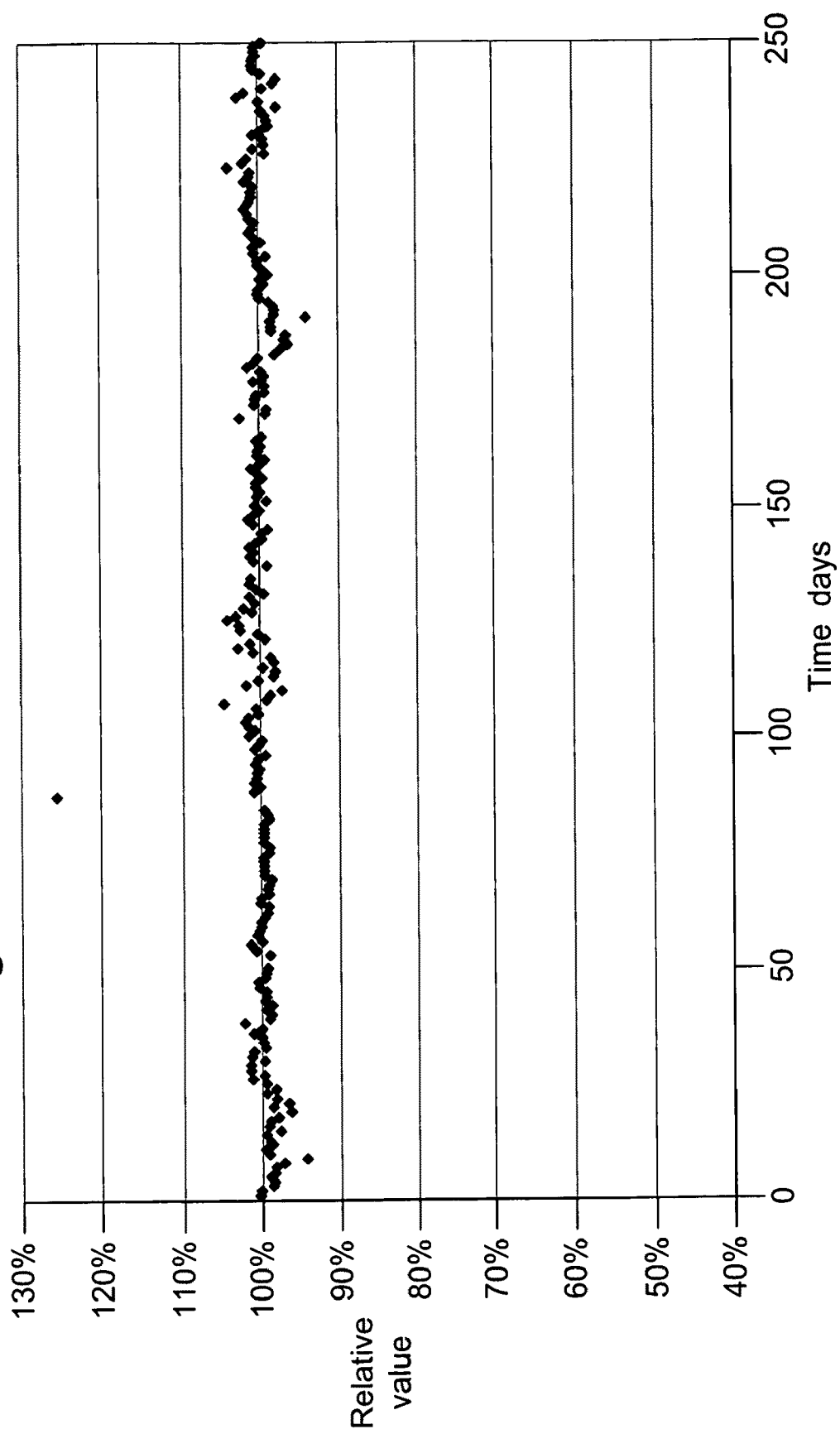
Fig.3  Heat coefficent over time

SLURRY PHASE POLYMERISATION PROCESS

CROSS REFERENCE TO RELATED APPLICATIONS

This application is a divisional of application Ser. No. 12/227,700 filed Nov. 25, 2008, now U.S. Pat. No. 7,718,732, which is a 371 of PCT/GB2007/001862, filed May 18, 2007, which claims priority to European Application Nos. 06252746.0, filed May 26, 2006, 06252748.6, filed May 26, 2006, and 0625274.8, filed May 26, 2006, the entire contents of each of which are hereby incorporated by reference.

SLURRY PHASE POLYMERISATION PROCESS

The present invention is concerned with olefin polymerisation in slurry phase loop reactors, in particular in multiple reactor systems.

BACKGROUND OF THE INVENTION

Slurry phase polymerisation of olefins is well known wherein an olefin monomer and optionally olefin comonomer are polymerised in the presence of a catalyst in a diluent in which the solid polymer product is suspended and transported.

This invention is specifically related to polymerisation in at least one loop reactor of a multiple reactor system where the slurry is circulated in the reactor typically by means of a pump or agitator. Liquid full loop reactors are particularly well known in the art and are described for example in U.S. Pat. Nos. 3,152,872, 3,242,150 and 4,613,484.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The at least one loop reactor of a multiple reactor system is of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of the at least one loop reactor of a multiple reactor system can vary but is typically in the range 10 to 120 m$^3$ the loop reactors of the present invention are of this generic type.

Maximum commercial scale loop reactor plant capacities have increased steadily over the years. Growing operating experience over the last few decades has led to operation of increasingly high slurry and monomer concentrations in reaction loops. The increase in slurry concentrations has typically been achieved with increased circulation velocities achieved for example by higher reactor circulation pump head or multiple circulation pumps as illustrated by EP 432555 and EP 891990. The increase in solids loading is desirable to increase reactor residence time for a fixed reactor volume and also to reduce downstream diluent treatment and recycling requirements. The increased velocity and head requirement of the loop has however led to increasing pump design sizes and complexity, and energy consumptions as slurry concentrations increase. This has both capital and operating cost implications.

Historically relatively high circulation velocity has typically been maintained in the reaction loop in order to ensure good thermal, compositional and particle distribution across the reactor cross-section, particularly the avoidance of solids settling, stable flow characteristics, or excessive solids concentrations at the pipe wall rather than reduced to minimise pressure drop/power in the polymerisation loop.

Inadequate cross-sectional distribution could lead to increased fouling, reduced heat transfer and reduced polymer productivity and homogeneity. Construction and commissioning of new commercial plants is very expensive and therefore new designs seek to avoid or minimise changes to operating parameters that are seen to increase risk to the successful operation of the new unit.

SUMMARY OF THE INVENTION

In accordance with the present invention there is provided a process comprising polymerising in at least one loop reactor of a continuous tubular construction of a multiple reactor system an olefin monomer, optionally together with an olefin comonomer, in the presence of a polymerisation catalyst in a diluent to produce a slurry comprising solid particulate olefin polymer and the diluent wherein the average internal diameter of at least 50% of the total length of the reactor is at least 700 millimetres and the solids concentration in the reactor is at least 20 volume %, preferably 25 vol %, optionally wherein the at least one loop reactor has a volume of at least 10 preferably at least 25 m$^3$. Preferably at least 30 wt %, most preferably more than 40 wt %, of the polymer produced in the multiple reactor system is made in at least one loop reactor wherein the average internal diameter of at least 50% of the total length of the reactor is at least 700 millimetres.

One advantage of the present invention is that the specific energy consumption (i.e. the energy consumed per unit weight of polymer produced) of the loop reactor is reduced whilst maintaining a given reactor residence time and avoiding unacceptable reactor fouling. The invention is especially advantageous when it is desired to design and operate a reactor at high solids loadings when it has previously been considered necessary to use what have now been found to be excessively high loop circulation velocities.

This invention relates to a method and apparatus for continuous polymerization of olefins, preferably alpha mono olefins, in an elongated tubular closed loop reaction zone. The olefin(s) is continuously added to, and contacted with, a catalyst in a hydrocarbon diluent. The monomer(s) polymerise to form a slurry of solid particulate polymer suspended in the polymerisation medium or diluent.

Typically, in the slurry polymerisation process of polyethylene, the slurry in the reactor will comprise the particulate polymer, the hydrocarbon diluent(s), (co) monomer(s), catalyst, chain terminators such as hydrogen and other reactor additives. In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

BRIEF DESCRIPTION OF THE DRAWINGS

FIG. 1 shows a plot of power and current requirement of the pump (plotted as a relative value rather than absolute) over a period of one hour for the polymerisation of Example 1;

FIG. 2 shows a temperature transition profile for the polymerisation of Example 1, in which the temperature transition trend is constant throughout the reactor, indicating good homogeneity;

FIG. 3 shows the heat transfer coefficient for Example 1 over a period of 250 days, from which it can be seen that there is no long-term reduction in the coefficient.

DETAILED DESCRIPTION OF PREFERRED EMBODIMENTS

The slurry is pumped around the relatively smooth path-endless loop reaction system at fluid velocities sufficient (i) to maintain the polymer in suspension in the slurry and (ii) to maintain acceptable cross-sectional concentration and solids loading gradients.

It has now been found that, for high solids loadings, cross-sectional slurry concentration distributions (as evidenced by fouling, flow variations and/or heat transfer) can be maintained within acceptable operating limits whilst increasing the internal diameter of the tubular reactor above that which is conventionally regarded as operationally reliable for at least one of the reactors of a multiple reactor system. This is contrary to what the man skilled in the art would believe to be the case in the light of conventional process conditions where the internal diameter of the reactor is no greater than 600 millimetres and is typically about 500 millimetres.

The solids concentration in the slurry in the at least one loop reactor is preferably at least 20 volume %, more preferably at least 25 volume %, and most preferably at least 30 volume %, where volume % is [(total volume of the slurry−volume of the suspending medium)/(total volume of the slurry)]×100. The solids concentration measured as weight percentage which is equivalent to that measured as volume percentage will vary according to the polymer produced but more particularly according to the diluent used. Where the polymer produced is polyethylene and the diluent is an alkane, for example isobutane, it is preferred that the solids concentration is above 30 in particular above 40 weight % for example in the range 40-60 preferably 45%-55 weight % based on the total weight of the slurry.

We have found that operation of a polymerisation process in a multiple reactor system where at least one of reactors has an internal diameter of over 700 millimetres—i.e. a larger diameter reactor than is conventionally used in slurry polymerisation—can be carried out without any significant problems, particularly with regard to fouling at the reactor walls.

Preferably greater than 50% of the total length of the loop reactor has an internal diameter over 750 mm, for example over 850 mm, and preferably between 700 and 800 millimetres. It is preferred that greater than 50%, in particular greater than 70%, for example greater than 85% of the total length of the reactor has an internal diameter over 700 millimetres, in particular over 750 millimetres, for example between 700 and 800 millimetres.

A particular advantage of this invention is that high slurry concentrations at relatively low circulation velocities and relatively high reactor loop diameters can be used. Accordingly, the Froude number in the reactor is preferably maintained at or below 30, for example in the range 24 to 0.5, more preferably 20 to 1, particularly in the range 15 to 2, with the most preferred ranges being 10 to 3 or 9 to 2. The Froude number is a dimensionless parameter indicative of the balance between the suspension and settling tendencies of particles in a slurry. It provides a relative measure of the momentum transfer process to the pipe wall from particles compared to the fluid. Lower values of the Froude number indicate stronger particle-wall (relative to fluid-wall) interactions. The Froude number (Fr) is defined as $v^2/(g(s-1)D)$ where v is the average velocity of the slurry, g is the gravitational constant, s is the specific gravity of the solid in the diluent and D is the internal pipe diameter. The specific gravity of the solid polymer which is the ratio of the density of the polymer to the density of water is based on the annealed density of the degassed polymer after being substantially devolatilised and immediately prior to any extrusion as measured using method ISO1183A.

It has been found that reactors can be designed and operated at specific pressure drop both per unit reactor length and per mass of polymer and total pressure drop for the loop less than that taught as being required, particularly at high solids loadings and large reactor diameters. This invention permits total loop pressure drops of less than 1.3 bar, particularly less than 1 bar even for polymer production rates of above 25, even above 45 tonnes per hour. It is possible to employ one or more than one pump in the loop preferably on one or more horizontal sections; these can be located on the same horizontal section or on different sections. The pump or pumps can be of the same diameter or larger or smaller diameter preferably of the same diameter as the internal diameter of the section of the reactor where the pump or pumps are located. It is preferable to employ a single pump and it is a feature of the present invention that requirements for number and power of pump(s) is less onerous than for conventional processes.

Reactor size is typically over 10 $m^3$, usually over 25 $m^3$ in particular over 50 $m^3$ for example 75-200 $m^3$ preferably in the range 100-175 $m^3$.

Use of higher internal diameter reactors for at least one loop reactor of a multiple reactor system as set out herein above enables reactors, for example having volumes of greater than 80 $m^3$, to be built with a reactor length to diameter ratio of less than 500, preferably less than 400 more preferably less than 250. Reduction in reactor length to diameter ratio minimises compositional gradients around the reaction loop and enables production rates of greater than 25 tonnes (per reactor) per hour to be achieved with only a single point of introduction for each reagent around the reaction loop. Alternatively it is possible to have multiple inlets into the loop reactor for reactants (e.g. olefins), catalyst, or other additives.

Where a reactor system is designed to operate different catalyst types (e.g. Ziegler-Natta, chromium and/or metallocene) or a catalyst system where the activity or production ratio required varies significantly between reactors under different operating regimes, reactors of equal volume reactors are typically used in order to accommodate the entire grade range with maximum flexibility. The existence of such externally imposed reactor dimensions places constraints on the operating window available for each reactor, and thus on the ability to balance reactor activity, product quality, throughput and cooling in each reactor. It is generally preferred that such reactors have the same average internal diameter, it is most preferred that the reactors are constructed to the same dimensions.

In a further embodiment of the present invention it is preferred that the loop reactor has horizontal and vertical sections, and the vertical sections comprise at least 50% preferably at least 60% more preferably at least 70% of the total length of the reactor.

It is also preferred that the density span of the polymer powder particles (defined as the absolute value of the density difference in g/cm$^3$ between the average density of the polymer particles exiting the reactor with particle size above D90 and the average density of the material with particle size below D10) is below 0.005, preferably below 0.003, more preferably below 0.0026, most preferably below 0.0023.

Accordingly, a further independent aspect of the invention provides process for controlling a slurry phase (co-) polymerisation process in the presence of a polymerisation catalyst, characterised in that the said process comprises maintaining the density SPAN of the polymer powder particles below 0.005, preferably below 0.003, more preferably below 0.0026, most preferably below 0.0023.

D values are measured by sieving granulometry and are expressed in pun, and may be defined as follows:

D5: value under which 5% by weight of the particles are collected;

D10: value under which 10% by weight of the particles are collected;

D50: value under which 50% by weight of the particles are collected;

D90: value under which 90% by weight of the particles are collected.

D95: value under which 95% by weight of the particles are collected.

A preferred embodiment also maintains a particle size distribution such that (D90–D10)/D50 is less than 2, preferably less than 1.5, more preferably less than 1.2. It is also preferred that D95 is less than 2000 µm, preferably less than 1500 µm, more preferably less than 1000 µm, most preferably less than 355 µm where D95, D90, D50 and D10 are defined such that 95 wt %, 90 wt %, 50 wt % or 10 wt % of the polymer particles have a diameter of less than D95, D90, D50 and D10 respectively. The average particle size D50 is preferably between 100 and 1500 microns, most preferably between 150 and 1000 microns.

A particularly preferred embodiment has a particle size distribution such that D95 is less than 355 µm and (D90–D10)/D50 is less than 1.2, where D95, D90, D50 and D10.

A further independent aspect of the invention provides a process comprising polymerising in a loop reactor of a continuous tubular construction an olefin monomer optionally together with an olefin comonomer in the presence of a polymerisation catalyst in a diluent to produce a slurry comprising solid particulate olefin polymer and the diluent wherein the average internal diameter of at least 50% of the total length of the reactor is at least 650 millimeters, the solids concentration in the reactor is at least 15 volume % and having a particle size distribution such that (D90–D10)/D50 is less than 2.

A still further independent aspect of the invention provides a process for polymerising olefins in a polymerisation reactor, characterised in that the polymer powder recovered from the reactor has a particle size distribution such that D95 is less than 1500 µm and (D90–D10)/D50 is less than 1.5.

According to another preferred embodiment of the present invention, it has been found that the claimed control, i.e. the maintenance of the density span below certain values, was highly critical for the metallocene catalysts.

A further benefit of the present invention is to improve the speed and safety associated with start-ups and grade transitions. When changing grades, the compositions of monomers and hydrogen and the product properties may be changing continuously, the quantity of absorption of monomers in the polymer will additionally be altered by the changing product properties (principally density) and gas composition.

The control of the span according to the present invention enables the speed of start-ups and transitions to be improved and the production of wide-specification material to be minimised.

It has particularly been found that stable operation of high capacity reactors, particularly large diameter loop reactors, can be optimised by strictly controlling the density span of the powder within or withdrawn from the reactor.

With many catalyst systems the density span can vary significantly with particle size and/or particle size distribution. The principal determinants of the average particle size of the powder are the residence time in the reactor and the catalyst yield. The particle size distribution of the powder can be affected by many factors including the type, and particle size distribution, of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor to assist in control of the average particle size and the particle size distribution of the powder in the reactor. The location of the withdrawal point for the concentrating device and the design and operating conditions of the concentrating device system, preferably the at least one hydrocyclone recycle loop, also enables the particle size and particle size distribution within the reactor to be controlled.

An alternative is to select a specific catalyst which has been found to give the desired particle size distribution. The advantage of catalyst systems which provide the desired particle size distribution is that they can be used at high productivity: generally the higher the productivity (as measured in g polymer per g of catalyst) the larger the individual polymer particles formed. Thus the present invention permits the use of catalyst systems having productivity of at least 5000 g polyolefin/g of catalyst, and typically at least 10000 g polyolefin/g of catalyst, most preferably above 15000 g polyolefin/g of catalyst.

A pre-polymer of controlled particle size distribution made using any catalyst as described above may also be introduced to the polymerization reactor. The prepolymerisation may be carried out by any suitable process, for example, polymerisation in a liquid hydrocarbon diluent or in the gas phase using a batch process, a semi-continuous process or a continuous process. The conversion to prepolymer is generally carried out by bringing the catalyst into contact with one or more alpha-olefins in amounts such that the prepolymer contains between 0.002 and 10 millimoles of transition metal per gram. The prepolymer particle size may be controlled by sieving, hydrocyclone or elutriation separation of fines or large particles or other known techniques.

In these and other embodiments of the present invention comprising a multiple reactor system wherein one of the reactors is a loop reactor, the loop reactor may have one or more characteristics of the loop reactor as set out hereinabove. The second or any subsequent reactor of the multiple reactor system may be another loop reactor or any reactor for the polymerisation of olefins, for example a fluidised-bed reactor. However, it is preferable that the second or any subsequent reactor of the multiple reactor system is another loop reactor which may or may not have one or more characteristics of the loop reactors as set out hereinabove. For example, the loop reactor of the invention may have an internal diameter of at least 50% of its length greater than 700 millimetres, whilst the second or any subsequent loop reactor may have an internal diameter greater than 500 millimetres for example greater than 600 millimetres preferably greater than 700 millimetres.

The multiple reactor system can be used to make monomodal or multimodal, preferably multimodal polymers. Preferably the process of the invention comprises making a multimodal ethylene polymer, in particular a bimodal ethylene polymer, in which a low molecular weight (LMW) polymer is made in one reactor, and a high molecular weight (HMW) polymer is made in another reactor, the polymers being made in either order and the second polymer being made in the presence of the first. One or both of the reactors may have an internal diameter of at least 700 mm along at least 50% of its length.

In one embodiment of the invention, the process in the multiple reactor system comprises making a multimodal ethylene polymer having a density greater than 940 kg/m$^3$ and a melt flow index MI$_5$ of 0.05 to 50 g/10 min, said ethylene polymer comprising— from 30 to 70 wt %, based on the total weight of the ethylene polymer, of a first polyethylene fraction having a density of at least 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene and optionally up to 5 mol % of at least one other alpha-olefin containing from 3 to 12 carbon atoms, and a melt flow index MI$_2$ of less than 10 g/10 min.

An alternative polymer is a multimodal ethylene polymer having a density between 900 and 930 kg/m$^3$ and a melt flow index MI$_2$ of 0.1 to 20 g/10 min, said ethylene polymer comprising:

from 30 to 70 wt %, based on the total weight of the ethylene polymer, of a first polyethylene fraction having a density of less than 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene, from 0.1 to 20 mol % of an alpha-olefin containing from 3 to 12 carbon atoms, and a melt flow index MI$_2$ of less than 10 g/10 min.

The loop reactor utilised in the present invention is the reactor in which either the first or second polyethylene fraction referred to above is made.

Although it may be made in more than two reactors, it is most preferred that the polymer is a bimodal polymer made in two reactors in series. One or both of the reactors may have an internal diameter of at least 700 mm along at least 50% of its length. The first polymer made in the first reactor may be a low molecular weight (LMW) polymer and the second polymer made in the second reactor may be a high molecular weight (HMW) polymer. In one embodiment, 30-70 wt % and more preferably 40-60 wt % of a low molecular weight (LMW) polymer is made in the first reactor, and 70-30 wt % and more preferably 60-40 wt % of a high molecular weight (HMW) polymer is made in the second reactor. The most preferred range of ratios of the HMW and LMW polymers is 45-55 wt % to 55-45 wt %.

In an alternative embodiment, the HMW polymer is made in the first reactor and the LMW polymer in the second reactor, preferably in the same ratios as mentioned above. The following requirements apply to this embodiment only. In this case the first (HMW) reactor preferably has a space time yield (defined as production of polymer in kg/h per unit volume of reactor) greater than 100 kg/m$^3$/h, more preferably greater than 150 kg/m$^3$/h, and most preferably greater than 250 kg/m$^3$/h. It is also preferred in this case that the ratio of space time yield in the first (HMW) reactor to the second (LMW) reactor is greater than 1, more preferably greater than 1.2, most preferably greater than 1.5. This may be achieved by designing the first (HMW) reactor with a volume that is no more than 90%, preferably between 30-70%, and more preferably approximately 40-60%, of the volume of the second (LMW) reactor. Under the above circumstances, preferably the ratio of length to diameter (L/D) of the first reactor is greater than 350, more preferably between 500 and 3000, most preferably greater than 750. The ratio of L/D of the first reactor to L/D of the second reactor is alternatively or additionally also preferred to be greater than 1.5, most preferably greater than 2.

In the HMW-LMW embodiment of the invention, in the case where the reactors differ in volume by no more than 10%, it is preferred to balance the activities between the reactors and the respective cooling capacities by maintaining the temperature of the first reactor between 60° C. and 80° C., preferably no higher than 75° C. It is also preferred that the ratio of solids concentration in the first reactor to that in the second reactor is maintained less than 1.0, preferably between 0.6 and 0.8, as this also assists in maintaining the activity balance between the two reactors within the desired range. Generally the solids concentration in the final reactor is at least 35 wt %, most preferably between 45 wt % and 60 wt % and the solids concentration in the HMW reactor is between 20 wt % and 50 wt %, more preferably between 25 wt % and 35 wt %. Under these circumstances it is preferred to concentrate the solids transferred from the first reactor to the second reactor using a settling zone and/or hydrocyclone to concentrate the solids concentration. A comonomer free diluent stream is most preferably introduced upstream of the hydrocyclone to minimize the comonomer transferred to the downstream reactor, thus maximizing the density potential in LMW reactor. The solids concentration is based on the weight of polymer in the total weight of the slurry of particulate polymer.

When the HMW polymer is produced in a reactor upstream of the LMW polymer reactor it is preferred that the ratio of the average internal diameter of the HMW reactor to the average internal diameter of the LMW reactor is between 0.8 and 1.4, generally less than 1, preferably less than 1.2, most preferably less than 1.4. In this configuration it is preferred that at least 50% of the total length of the LMW reactor is at least 700 mm, whereas the average internal diameter of the HMW reactor is less 700 millimetres, preferably less than 600 millimetres.

When the LMW polymer is produced in a reactor upstream of the HMW polymer reactor it is preferred that the ratio of the average internal diameter of the HMW reactor to the average internal diameter of the HMW reactor is between 0.6 and 1.4, generally between 0.8 and 1.2, most preferably between 0.9 and 1.1. It is preferred that the reactors have the same average internal diameter, it is most preferred that both reactors are constructed to the same dimensions.

Referring generally to the present invention, in the case where the multiple reactor system comprises two loop reactors, it is preferred that the Froude number in at least one loop reactor is no more than 30, and the ratio of the Froude number in that reactor to the Froude number in the other loop reactor is in the range 0.1 to 10 preferably 0.2 to 5.

In a further embodiment of the invention, a slurry containing polymer is withdrawn from the second reactor and transferred to a flash tank operating at a pressure P and temperature such that at least 50 mol % of the liquid component of the slurry is withdrawn from the flash tank as a vapour. Preferably the above process enables at least 98 mol %, more preferably 98.5 mol %, most preferably 98.5 mol %, of the vapour withdrawn from the flash tank to be condensed without compression. It is also preferred that at least 80 mol %, more preferably 90 mol %, most preferably 95 mol %, of the liquid component of the slurry is withdrawn from the flash tank as a vapour.

The pressure employed in the loop, or loops is preferably sufficient to maintain the reaction system 'liquid full' i.e. there is substantially no gas phase. Typical pressures used are between 1-100 bara, preferably between 30 to 50 bara. In ethylene polymerization the ethylene partial pressure will typically be in the range 0.1 to 5 MPa, preferably from 0.2 to 2 MPa, more particularly from 0.4 to 1.5 MPa. The temperatures selected are such that substantially all of the polymer produced is essentially (i) in a non-tacky and non-agglomerative solid particular form and (ii) insoluble in the diluent. The polymerization temperature depends on the hydrocarbon diluent chosen and the polymer being produced. In ethylene polymerisation the temperature is generally below 130° C., typically between 50 and 125° C., preferably between 75 and 115° C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115° C. The space time yield which is production rate of polymer per unit of loop reactor volume for the process of the present invention is in the range 0.1-0.4 preferably 0.2-0.35 ton/hour/m$^3$. Where there are two or more loops, the reaction conditions may be the same or different in different loops.

The process according to the invention applies to the preparation of compositions containing olefin (preferably ethylene) polymers which can comprise one or a number of olefin homo-polymers and/or one or a number of copolymers. It is particularly suited to the manufacture of ethylene polymers and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

Typical diluents employed in such reactions include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the diluent for ethylene polymerisation.

The operating conditions can also be such that the monomers (e.g. ethylene, propylene) act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. Any continuous withdrawal ports will typically have an internal diameter in the range 2-25, preferably 4-15, especially 5-10 cm This invention permits large scale polymerisation reactors to be operated with low diluent recovery requirements. The operation of large diameter reactors with high solids concentrations in the slurry minimises the quantity of the principal diluent withdrawn from the polymerisation loop. Use of concentrating devices on the withdrawn polymer slurry, preferably hydrocyclones (single or in the case of multiple hydrocyclones in parallel or series), further enhances the recovery of diluent in an energy efficient manner since significant pressure reduction and vaporisation of recovered diluent is avoided.

It has been found that the slurry concentration in the reactor loop can be optimised by controlling the average particle size and/or the particle size distribution of the powder within the reactor loop. The principal determinant of the average particle size of the powder is the residence time in the reactor. The particle size distribution of the powder can be affected by many factors including the particle size distribution of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor loop to further assist in control of the average particle size and the particle size distribution of the powder in the reactor. The location of the withdrawal point for the concentrating device and the design and operating conditions of the concentrating device system, preferably the at least one hydrocyclone recycle loop, also enables the particle size and particle size distribution within the reactor to be controlled. The average particle size is preferably between 100 and 1500 microns, most preferably between 250 and 1000 microns.

Where the final reactor of the multiple reactor system is a loop reactor, the withdrawn, and preferably concentrated, polymer slurry is depressurised, and optionally heated, prior to introduction into a primary flash vessel. The stream is preferably heated after depressurisation.

The diluent and any monomer vapours recovered in the primary flash vessel are typically condensed, preferably without recompression and reused in the polymerization process. The pressure of the primary flash vessel is preferably controlled to enable condensation with a readily available cooling medium (e.g. cooling water) of essentially all of the flash vapour prior to any recompression typically such pressure in said primary flash vessel will be 4-25 for example 10-20, preferably 15-17 bara. The solids recovered from the primary flash vessel is preferably passed to a secondary flash vessel to remove residual volatiles. Alternatively the slurry may be passed to a flash vessel of lower pressure than in the above mentioned primary vessel such that recompression is needed to condense the recovered diluent. Use of a high pressure flash vessel is preferred.

The process according to the invention can be used to produce resins which exhibit specific density in the range 890 to 930 kg/m$^3$ (low density), 930 to 940 kg/m$^3$ (medium density) or 940 to 970 kg/m$^3$ (high density).

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in Patent Application EP-500,944-A1 (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, preferably from 30 to 50% by weight from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine.

Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as LiAl($C_2H_5$)$_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 m$^2$/g, preferably from 400 to 550 m$^2$/g and a volume porosity of greater than 2 cc/g preferably from 2 to 3 cc/g.

Silica supported chromium catalysts are typically subjected to an initial activation step in air at an elevated activation temperature. The activation temperature preferably ranges from 500 to 850° C., more preferably 600 to 750° C.

The reactor system can comprise one or more loop reactors connected in series or in parallel preferably in series.

In the case of series reactors, a first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst. However, it is preferable to introduce the catalyst and the cocatalyst exclusively into a first reactor.

In the case of at least two reactors in series, the polymer of highest melt index and the polymer of lowest melt index can be produced in two adjacent or non-adjacent reactors in the series. Hydrogen is maintained at (i) a low (or zero) concentration in the reactor(s) manufacturing the high molecular weight components, e.g. hydrogen percentages including between 0-0.1 vol % and at (ii) a very high concentration in the reactor(s) manufacturing the low molecular weight components e.g. hydrogen percentages between 0.5-2.4 vol %. The reactors can equally be operated to produce essentially the same polymer melt index in successive reactors.

Particular sensitivity to operating in large diameter reactors (and associated cross-sectional compositional, thermal or particulate gradients) has however been related to production of polymer resins where polymer of either high or low molecular weight resins has been known to lead to increased fouling concerns. Particularly when producing polymers of molecular weights less than 50 kDaltons or greater than 150 kDaltons. These concerns have particularly been confirmed to be accentuated at low polymer solids concentrations in the reactor loop. When producing polymers of molecular weights less than 50 kDaltons or greater than 200 kDa (or melt index below 0.1 and above 50) in large diameter reactors it has however surprisingly been discovered that fouling is decreased when solids loadings are increased to above 20 vol %, particularly above 30 vol %.

EXAMPLES

As previously stated, one of the advantages of the invention is that cross-sectional slurry concentration distributions can be maintained within acceptable operating limits at high reactor diameters, even with high solids loadings. The actual cross-sectional slurry concentration distribution is not measurable directly, but other parameters can be measured as an indication of the homogeneity of the slurry.

Example 1

In the following Example, ethylene was polymerised in two reactors in series. The first reactor had a volume of 96 m$^3$ and an internal diameter along over 98% of its length of 730 mm. The solids content was 27-28 vol %. The volumetric solid content is defined as (Volumetric PE production rate/Volume of slurry exiting the reactor), where:

Volumetric PE production rate=(Ethylene mass feed−Ethylene mass flow exiting reactor)/density of PE]

Volume of slurry exiting the reactor=Volume of liquid exiting+volumetric PE production rate Volume of liquid exiting the reactor=[Sum of mass feeds in−PE mass production]/liquid density The PE density is measured on dry and degassed powder.

The density of liquid is calculated based on any suitable model (using composition, temperature and pressure).

Circulation Pump Power Requirement

The power requirement of the circulation pump inside the loop reactor is affected not only by the pressure of the flow, but also by the slurry concentration gradient. It is particularly sensitive to concentration gradients because it is located at an elbow in the loop reactor, where there is most likely to be segregation of the flow, which causes variations in the density of the slurry being pumped. Where there is little fouling and good circulation, a relatively constant power demand over time is observed. FIG. 1 shows a plot of power and current requirement of the pump (plotted as a relative value rather than absolute) over a period of one hour for the polymerisation of Example 1. The variation shown here is greater than would be expected for a pure solvent, but is low for a polymer-containing slurry, indicating that little or no segregation of the slurry is occurring.

Reactor Temperature

The temperature at different points in the reactor during is also affected by the slurry concentration gradient. Absolute differences in measured temperature at different points in a reactor can be due to differences in calibration of the thermocouples, so in order to identify "real" differences in temperature, the variation during a temperature transition is measured. In an inhomogeneous slurry the trend of such temperature transitions would vary. FIG. 2 shows such a transition for the polymerisation of Example 1. FIG. 2 shows that in Example 1 the temperature transition trend is constant throughout the reactor, indicating good homogeneity.

Heat Transfer Coefficient at the Reactor Wall

A significant effect of fouling of a reactor is a change in the heat transfer coefficient across the reactor wall. The heat transfer coefficient can be measured over a very long period (many months), and an absence of any reduction indicates that there is no build-up of fouling material over this time. FIG. 3 shows the heat transfer coefficient for Example 1 over a period of 250 days, from which it can be seen that there is no long-term reduction in the coefficient.

The invention claimed is:

1. A process for controlling a slurry phase (co-) polymerisation process in a reactor in the presence of a polymerisation catalyst, which process comprises maintaining the density SPAN of the polymer powder particles (defined as the absolute value of the density difference in g/cm$^3$ between the average density of the polymer particles exiting the reactor with particle size above D90 and the average density of the material with particle size below D10) below 0.005, D95 for the polymer powder particles being less than 1000 microns and the particle size distribution of the polymer particles being such that (D90-D10)/D50 is less than 1.5.

2. Process according to claim 1, wherein the particle size distribution of the polymer particles is such that (D90-D10)/D50 is less than 1.2, in which D10, D50 and D90 are the diameters under which 10%, 50% and 90% by weight respectively of the particles are collected.

3. Process according to claim 1, wherein D95 is less than 355 μm, in which D95 is the diameter under which 95% by weight of the particles are collected.

4. Process according to claim 1, in which an olefin monomer is polymerised in at least one continuous tubular loop reactor of a multiple reactor system in the presence of a polymerisation catalyst in a diluent to produce a slurry comprising solid particulate olefin polymer and diluent, wherein the average internal diameter of at least 50% of the total length of the continuous tubular loop reactor is at least 700 mm.

5. Process according to claim 4, wherein the solids concentration in the continuous tubular loop reactor is at least 20 volume %.

6. Process according to claim 4, wherein the average internal diameter of at least 50% of the total length of the continuous tubular loop reactor is at least 750 mm.

7. Process according to claim 4, wherein greater than 70% of the total length of the continuous tubular loop reactor has an internal diameter at least 700 mm.

8. Process according to claim 4, wherein greater than 70% of the total length of the continuous tubular loop reactor has an internal diameter at least 750 mm.

9. Process according to claim 4, wherein the Froude number is maintained in at least one reactor of the multiple reactor system at or below 30.

10. Process according to claim 4, wherein the total pressure drop in the loop of the reactor is less than 1.3 bar and the polymer production rate is greater than 25 tonnes per hour.

11. Process according to claim 4, wherein at least 30 wt % of the total polymer produced in the multiple reactor system is made in said continuous tubular loop reactor.

12. Process according to claim 1, which comprises making a multimodal ethylene polymer in which a low molecular weight (LMW) polymer is made in one reactor, and a high molecular weight (HMW) polymer is made in another reactor, the polymers being made in either order and the second polymer being made in the presence of the first.

13. Process according to claim 12, wherein either:
the multimodal ethylene polymer has a density greater than 940 kg/m$^3$ and a melt flow index MI$_5$ of 0.05 to 50 g/10 min, said ethylene polymer comprising—
from 30 to 70 wt %, based on the total weight of the ethylene polymer, of a first polyethylene fraction having a density of at least 950 kg/m$^3$ and a melt flow index MI$_2$ of at least 10 g/10 min, and
from 70 to 30 wt %, based on the total weight of the multimodal ethylene polymer, of a second polyethylene fraction comprising units of ethylene and optionally up to 5 mol % of at least one other alpha-olefin containing from 3 to 12 carbon atoms, and a melt flow index MI$_2$ of less than 10 g/10 min; or
the multimodal ethylene polymer has a density between 900 and 930 kg/m$^3$ and a melt flow index MI$_2$ of 0.1 to 20 g/10 min, said ethylene polymer comprising:

from 30 to 70 wt %, based on the total weight of the ethylene polymer, of a first polyethylene fraction having a density of less than 950 kg/m³ and a melt flow index $MI_2$ of at least 10 g/10 min, and from 70 to 30wt %, based on the total weight of the multimodal ethylene polymer, of a second polyethylene fraction comprising units of ethylene, from 0.1 to 20 mol % of an alpha-olefin containing from 3 to 12 carbon atoms, and a melt flow index $MI_2$ of less than 10 g/10 min.

14. Process according to claim 4, wherein the density SPAN of the polymer powder particles is maintained below 0.003.

15. Process according to claim 4, wherein the density SPAN of the polymer powder particles is maintained below 0.0026.

16. Process according to claim 4, wherein the density SPAN of the polymer powder particles is maintained below 0.0023.

17. Process according to claim 4, in which an olefin monomer is polymerised together with an olefin comonomer.

18. Process according to claim 5, wherein the solids concentration in the continuous tubular loop reactor is at least 25 volume %.

19. Process according to claim 5, wherein the solids concentration in the continuous tubular loop reactor is at least 30 volume %.

20. Process according to claim 6, wherein the average internal diameter of at least 50% of the total length of the continuous tubular loop reactor is at least 850 mm.

21. Process according to claim 6, wherein greater than 85% of the total length of the continuous tubular loop reactor has an internal diameter at least 700 mm.

22. Process according to claim 8, wherein greater than 85% of the total length of the continuous tubular loop reactor has an internal diameter at least 850 mm.

23. Process according to claim 9, wherein the Froude number is maintained in at least one reactor of the multiple reactor system at between 1 and 20.

24. Process according to claim 9, wherein the Froude number is maintained between 2 and 15.

25. Process according to claim 10, wherein the total pressure drop in the loop of the reactor is less than 1 bar, and the polymer production rate is greater than 45 tonnes per hour.

26. Process according to claim 11, wherein more than 40 wt % of the total polymer produced in the multiple reactor system is made in said continuous tubular loop reactor.

* * * * *